United States Patent
Passinger et al.

(10) Patent No.: US 9,704,407 B2
(45) Date of Patent: Jul. 11, 2017

(54) AIRCRAFT SYSTEMS AND METHODS WITH ENHANCED NOTAMS

(71) Applicant: HONEYWELL INTERNATIONAL INC., Morristown, NJ (US)

(72) Inventors: Bretislav Passinger, Prerov (CZ); Petr Hornych, Nove Mesto nad Metuji (CZ); Dominik Vahala, Hustopece (CZ); Ivan Lacko, Cana (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/601,641

(22) Filed: Jan. 21, 2015

(65) Prior Publication Data
US 2016/0209234 A1  Jul. 21, 2016

(51) Int. Cl.
*G08G 5/00* (2006.01)
*B64D 43/00* (2006.01)
*G01C 23/00* (2006.01)

(52) U.S. Cl.
CPC ........... *G08G 5/0047* (2013.01); *B64D 43/00* (2013.01); *G01C 23/00* (2013.01)

(58) Field of Classification Search
CPC ...... G01C 23/005; G01C 23/00; B64D 43/00; G08G 5/0047
See application file for complete search history.

(56) References Cited

U.S. PATENT DOCUMENTS

2010/0333040 A1* 12/2010 Palanisamy ............ G01C 23/00
                                                               715/854
2013/0027226 A1  1/2013 Cabos

FOREIGN PATENT DOCUMENTS

EP    1658473 B1    10/2013
EP    2696171 A3    4/2014

OTHER PUBLICATIONS

"SkyDemon Flight-Planning Features", <http://www.skydemon.aero/plan/> archived May 5, 2014, and retrieved Apr. 20, 2016.*
SkyDemon; SkyDemon Flight-Planning Features; [Retrieved from Internet http://www.skydemon.aero/plan] Feb. 4, 2014. Copyright MMXIII Divelements Limited, all rights reserved.
Kostal, E.; NOTAM Visualization Graphical NOTAMs Finally a Reality; [Retrieved from Internet http://aeronavdata.com/wp-content/uploads/2013/09/KORD-Selected-Screen-Shot.jpg].
Partial EP Search Report for Application No. 15194400.6-1557 dated Jun. 23, 2016.
Extended EP Search Report for Application No. 15194400.6-1557 / 3056863 dated Oct. 11, 2016.

* cited by examiner

*Primary Examiner* — Mussa A Shaawat
*Assistant Examiner* — Michael Kerrigan
(74) *Attorney, Agent, or Firm* — Lorenz & Kopf, LLP

(57) ABSTRACT

An aircraft system includes a processing unit configured to receive navigation data and notice to airmen (NOTAM) information and to generate display signals based on the navigation data and the NOTAM information. The system further includes a display device coupled to the processing unit and configured to render an image according to the display signals with a first area depicting a navigation display based on the navigation data and a second area depicting a list of NOTAM text messages.

8 Claims, 11 Drawing Sheets

AIRCRAFT SYSTEMS AND METHODS WITH ENHANCED NOTAMS

STATEMENT REGARDING FEDERALLY SPONSORED RESEARCH OR DEVELOPMENT

This invention was made with Government support under TA02030835 awarded by Technology Agency of the Czech Republic. The Government has certain rights in the invention.

TECHNICAL FIELD

The present invention generally relates to aircraft display systems and methods, and more particularly relates to aircraft systems and methods with enhanced NOTAM information.

BACKGROUND

Typically, a pilot navigates an aircraft according to a flight plan loaded into a Flight Management System ("FMS"). Among other things, the flight plan generally includes a number of geographic waypoints that define a planned track of the aircraft and the specific times at which the aircraft is to arrive at those waypoints. The flight plan also includes information concerning that availability of runways at the point of origin and destination.

Prior to and during flight, the pilot reviews or accesses portions of a pre-flight briefing document package, including notice to airmen messages ("NOTAM"). A NOTAM is a message that is filed with an aviation authority to alert aircraft pilots of any hazards located along the flight plan or at specific locations. Such hazard information may include restricted air space, runway or taxiway closures or limitations, navigation aid unavailability or limitations, aerodromes or aerodrome services changes and limitations, changes in departure, arrival, and approach procedures, and foul weather, as examples.

Traditionally, pilots receive multiple NOTAMs in paper or electronic form in fixed page presentation format (e.g. PDF) to be parsed, deciphered, and manually evaluated. Emerging technology standards (e.g, AIXM) enable the sending and receiving of NOTAM messages in a more structured format, generally referenced as Digital NOTAMs or D-NOTAMs. Additionally, at times, NOTAMs are issued after flight planning and transmitted to the aircraft for consideration by the pilot while preparing for departure or during flight. Due to these characteristics, the interpretation and evaluation of NOTAMs by the pilot may be inefficient, particularly during flight.

Accordingly, it is desirable to provide improved systems and methods for presenting NOTAM information to a pilot, flight crew, or other users. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an aircraft system is provided. The system includes a processing unit configured to receive navigation data and notice to airmen (NOTAM) information and to generate display signals based on the navigation data and the NOTAM information. The system further includes a display device coupled to the processing unit and configured to render an image according to the display signals with a first area depicting a navigation display based on the navigation data and a second area depicting a list of NOTAM text messages.

In accordance with an exemplary embodiment, a method is provided for presenting notice to airmen (NOTAM) information on an aircraft visual display. The method includes receiving NOTAM information; determining, with a processing unit, a first NOTAM text message and a first location from the NOTAM information; rendering, with a display device, the first NOTAM text message in a first area of an image; and selectively rendering, with the display device, a first highlight associated with the first location in a second area of the image.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide aircraft systems and methods that display enhanced "notice to airmen" information (hereinafter "NOTAM" or "NOTAM information") to a pilot or user. In one exemplary embodiment, the NOTAM information includes a list of textual messages with connectors linking the messages to the appropriate locations on the map or navigational view. The map view may include symbology corresponding to the content of the NOTAMs that are contained in the NOTAM list, as well as additionally symbology corresponding to the selected item in the NTOAM list. As such, during operation, a user may scroll through the NOTAM list while taking note of the corresponding locations impacted by the NOTAMs.

Figure 1:
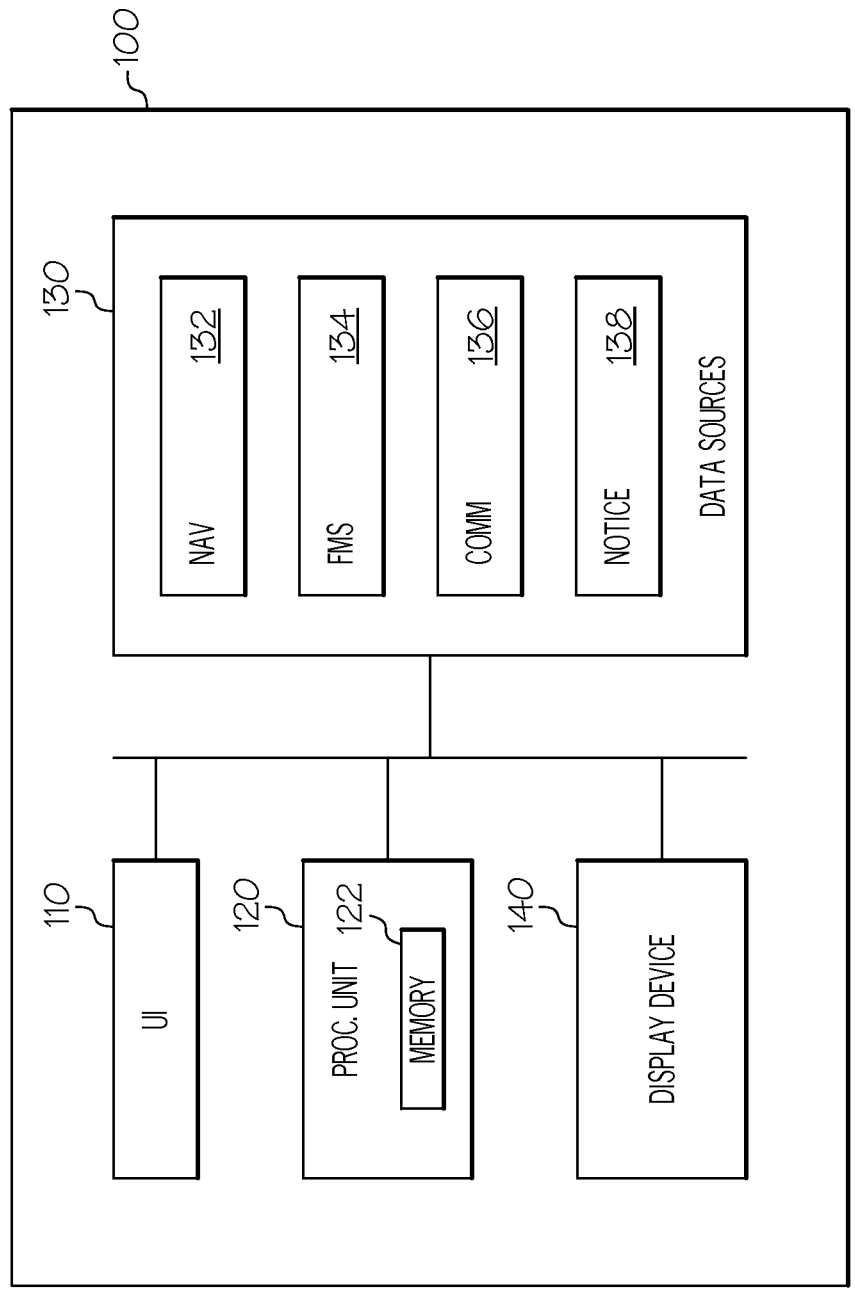
FIG. 1 is a block diagram of an aircraft system in accordance with an exemplary embodiment.

FIG. 1 is a block diagram of an aircraft system 100 in accordance with an exemplary embodiment. It should be understood that FIG. 1 is a simplified representation of the system 100 for purposes of explanation and ease of description. Further exemplary embodiments of the system 100 may include additional, other devices and components for providing further functions and features. Typically, the system 100 is implemented on an aircraft, although certain components may be off-board the aircraft. As described below, the system 100 is typically utilized by a user (e.g., a pilot or flight crew) during flight planning, after flight planning, and/or during flight to view and consider NOTAM information.

As shown in FIG. 1, the system 100 includes a user interface 110, a processing unit 120, one or more data sources 130, and a display device 140 coupled together in any suitable manner, such with as a data bus. Each component is introduced below prior to a more detailed description of particular features of the system 100 described in conjunction with FIGS. 2-11.

Generally, the user interface 110 is coupled to the processing unit 120, and the user interface 110 and the processing unit 120 are cooperatively configured to allow a user to interact with the display device 140 and/or other elements of the system 100, as described in greater detail below. Depending on the embodiment, the user interface 110 may be realized as a keypad, touchpad, keyboard, mouse, touch panel, joystick, knob, line select key or another suitable device adapted to receive input from a user. In some embodiments, the user interface 110 may be incorporated into the display device 140, such as a touchscreen. In further embodiments, the user interface 110 is realized as audio input and output devices, such as a speaker, microphone, audio transducer, audio sensor, or the like.

The processing unit 120 is coupled to the user interface 110, data sources 130, and display device 140 and generally represents the hardware, software, and/or firmware components configured to facilitate communications and/or interaction between the user interface 110 and the other elements of the system 100. Depending on the embodiment, the processing unit 120 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof. In practice, the processing unit 120 includes processing logic that may be configured to carry out the functions, techniques, and processing tasks associated with the operation of the system 100. Furthermore, the steps of a method are accessible by the processing unit 120 to provide the information necessary for carrying out the functions described herein. The data sources 130 are referenced below as systems, although in exemplary embodiments, the data sources 130 may include one or more databases, sensors, or portions of other systems. It is noted that, although these data sources 130 are, for clarity and convenience, shown as being stored separate from the processing unit 120, all or portions of these data sources 130 may be loaded into memory 122 or integrally formed as part of the processing unit 120. As examples and without limitation, the data sources 130 include a navigation system 132, a flight management system (FMS) 134, a communication system 136, and a notice database 138. Each data source 130 is briefly described below.

In an exemplary embodiment, the navigation system 132 is configured to provide real-time navigational data and/or information regarding operation of the aircraft. The navigation system 132 may include or cooperate with a global positioning system (GPS), inertial reference system (IRS), or a radio-based navigation system (e.g., VHF omni-directional radio range (VOR) or long range aid to navigation (LORAN)). The navigation system 132 is capable of obtaining and/or determining the current state of the aircraft, including the location (e.g., the latitude and longitude), the altitude or above ground level, and the heading. The navigation system 132 may further include or have access to one or more of the following databases: a terrain database, an airport database, an obstacle database, a geopolitical database, a terminal airspace database, and/or a special use airspace database.

As an example, the terrain database stores various types of data representative of the terrain associated with the flight plan. The processing unit 120 is configured to process the retrieved terrain data and supply image rendering display commands to the display device 140 that cause the display device 140 to render an image representative of at least a portion of the processed terrain data, examples of which are discussed below. In various exemplary embodiments, the rendered image may be a two-dimensional lateral view of the terrain, a two-dimensional vertical profile view of the terrain, or a three-dimensional perspective view of the terrain.

The airport database may contain aircraft procedure information for a number of airports and maintains the association of the aircraft procedure information and the corresponding airport. Other navigation-related data stored or accessible by the navigation system 132 include various flight plan related data such as, for example, waypoints, distances between waypoints, headings between waypoints, data related to different airports, navigational aids, obstructions, airspace, political boundaries, communication frequencies, and aircraft approach information. Such data may be represented on the display device 140, as discussed below.

As noted above, the processing unit 120 is also coupled to the FMS 134. Generally, the FMS 134 is coupled to the other data sources 130, as well as other systems, to support navigation, flight planning, and other aircraft control functions, as well as to provide real-time data and/or information regarding the operational status of the aircraft. The FMS 134 may include or otherwise access one or more of the following: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag, and/or other suitable avionics systems. As examples, the FMS 134 may identify operating states of the aircraft, such as, engine operation and current aircraft configuration status, including information such as the current flap configuration, engine revolutions per minute, aircraft speed, aircraft pitch, aircraft yaw, aircraft roll, fuel flow, fuel quantity, fuel remaining, and the like. Additionally, the FMS 134 may identify or otherwise determine environmental conditions at or near the current location of the aircraft, such as, for example, the current temperature, wind speed, wind direction, atmospheric pressure, turbulence, and the like. The FMS 134 may also identify optimized speeds, distance remaining, time remaining, cross track deviation, navigational performance parameters, and other travel parameters.

The processing unit 120 is also coupled to the communication system 136, which is configured to support communications to and/or from the aircraft, as well as between system components. For example, the communication system 136 is suitably configured to support communications between the aircraft and air traffic control or other suitable command center or ground location, including receipt of the NOTAMs discussed below. In this regard, the communication system 136 may be realized using a radio communication system or other suitable data link system. In some embodiments, the communication system 136 may be in communication with a ground system parser that at least partially processes the NOTAM information prior to receipt by the processing unit 120.

As introduced above, the notice database 138 stores or otherwise receives NOTAM information. In various embodiments, the NOTAM information may be stored on-board the aircraft or remotely and supplied to the aircraft in real-time via the communication system 136. The notice database 138 may also include data that associates NOTAM information with various navigation-related data provided by the navigation system 132, various flight plan and aircraft information data provided by the FMS 134, and other applicable information. Furthermore, the notice database 138 may store symbology that visually represents the nature of the NOTAM information. The display and usage of NOTAM information by the system 100 are discussed in greater detail below after additional general information regarding the source, content, and format of the NOTAM information.

Generally, a NOTAM is a notice filed with an aviation authority to alert aircraft pilots of potential hazards along a flight route or at a particular location, such as the destination airport. In one exemplary embodiment, NOTAMs are created and transmitted by government agencies and airport operators under guidelines specified by Annex 15: Aeronautical Information Services of the Convention on International Civil Aviation (CICA), which may be incorporated herein by reference. Additional information about NOTAMs may be found in the applicable FAA or government guidelines. Generally, the NOTAMs discussed below refer to all forms of NOTAMs, such as airport surface NOTAMs, obstacle NOTAMs, trigger NOTAMs, pointer NOTAMs, Special activity airspace (SAA) NOTAMs, Military specific NOTAMs, and other data with NOTAM-like characteristics (e.g. Flexible Use Airspace ASM messages). As noted above, the NOTAMs may be static or dynamically updated during flight via the communication system 136 for use pre-flight and in-flight, as well as for strategic decisions such as deviations and diversions.

As described below, the NOTAM typically includes a string of text to indicate various types of information. The information may be directly listed as part of the text of the NOTAM itself or as pointers or references to stored data for decoding. As noted above, NOTAMs may include the text field as well as additional metadata describing the nature of the NOTAM information, the location or components impacted by the NOTAM information, and the timing of the NOTAM information. More structured types of NOTAMs may be referred to as Digital-NOTAMs or D-NOTAMs.

The NOTAM may be formatted in a number of ways at varying levels of structure and complexity that may be readable by humans, machines, and/or a combination thereof. As an example, an exemplary text-based NOTAM may state "TWY B CLSD BTN C AND D EXC AC WINGSPN BLW 80FT MO-FR DLY 10-16 20141111-20141112", and may be interpreted as "Taxiway B Closed Between Area C And Area D on Monday until Friday, daily 10-16 from 2014 Nov. 11 until 2014 Nov. 12". In further embodiments, a more formatted NOTAM may include human readable and decodable text in a format that may be more readily interpreted by a processor (e.g., processor 110). One such example corresponding to the previous NOTAM example is provided below:
 ContentCode=SomeTaxiwayClosure
 Text=TWY B CLSD BTN C AND D
 ScheduleText=MO-FR DLY 10-16
 TimeFrom=20141111 TimeTo=20141112

In further embodiments, such as a D-NOTAM, the NOTAM is primarily intended for a processor (e.g., processing unit 120). One such example corresponding to the previous NOTAM information example is provided below:
 Content=SomeTaxiwayClosure
 IdOfClosedTwy=B
 IdClosedFrom=C
 IdClosedTill=D
 WithExecpt=Wingspan
 WithWigspanValue=<80 FT
 Text=Taxiway B Closed Between C and D except for aircraft with wingspan below 80 ft.
 ScheduleDays=MO-FR
 ScheduleType=daily
 ScheduleTimes=10-16
 TimeFrom=20141111 TimeTo=20141112

Although the exemplary embodiments discussed herein are applicable to any type of structure, the D-NOTAMs particularly provide reliable metadata describing what is impacted and the schedule, as well as integrated geo-referencing and symbols, for enhanced precision.

Any suitable format for the NOTAM may be implemented. Although examples of format and type are described above, in general, the term "NOTAM" is broad enough to encompass any notice or message to the pilot, regardless of format or source. In one exemplary embodiment, designated lines of the NOTAM may indicate some or all of the following types of information: a NOTAM identification (e.g., series, sequence number, and year of issue); the type of operation; a reference to a previously-issued NOTAM; information about who the NOTAM affects; area of influence of the NOTAM; the start date and time and finish date and time of the NOTAM; height restrictions of the NOTAM; and a full description of the substance of the NOTAM. By way of example only, the NOTAM may convey the following information: hazards such as air shows, parachute jumps, kite flying, lasers, rocket launches, etc.; temporary flight restrictions; closed runways; inoperable radio navigational aids; military exercises with resulting airspace restrictions; inoperable lights on tall obstructions; obstacles near airfields; passage of flocks of birds through airspace; notifications of runway/taxiway/apron status with respect to snow, ice, and standing water; and/or notification of an operationally significant change in volcanic ash or other dust contamination. More specific examples of NOTAMs are provided below.

As such, when the system 100 receives a NOTAM, typically via the communication system 136 or entered by the user, and the processing unit 120 stores the associated NOTAM information in the notice database 138. In some embodiments, the processing unit 120 decodes or otherwise interprets NOTAM information using software and/or tables stored in the notice database 138. The processing unit 120 may further evaluate the NOTAM information in view of the flight plan and/or destination, e.g., by evaluating the time, location, and nature of the NOTAM information to determine relevance. If deemed relevant, the NOTAM information may be prioritized by the processing unit 120 as a function of importance, time, or distance. For example, the NOTAM information may be organized sequentially along the route of the flight plan. As described below, the processing unit 120 evaluates the NOTAM information to associate the NOTAM with a particular location and symbology that is represented on the display device 140.

The display device 140 is realized as an electronic display configured to graphically display flight information or other data associated with operation of the aircraft under control of the processing unit 120 and/or other components of the system 100, as well as the user via the user interface 110. In this regard, the display device 140 is configured to display, render, or otherwise convey one or more graphical representations or images associated with the navigation of the aircraft on the display device 140, particularly with respect to NOTAM information, as described in greater detail below.

The display device 140 may be implemented as a panel mounted display, a HUD (head-up display) projection, or any one of numerous technologies and configured as any one of numerous types of aircraft flight deck displays, including a primary flight display (PFD), a horizontal situation indicator, or a vertical situation indicator. In the depicted embodiments below, however, the display device 140 is configured as a multi-function display (MFD) that is displaying a lateral situation view.

FIGS. 2-11 are visual displays 200 rendered by the system 100 on the display device 140 in accordance with exemplary embodiments. FIG. 1 will be referenced below in the discussion of FIGS. 2-11. Generally, the visual displays 200 include includes exemplary textual, graphical, and/or iconic information rendered by the display device 140 in response to appropriate display commands from the processing unit 120 based on data from data sources 130 and/or user input via the user interface 110.

Figure 2:
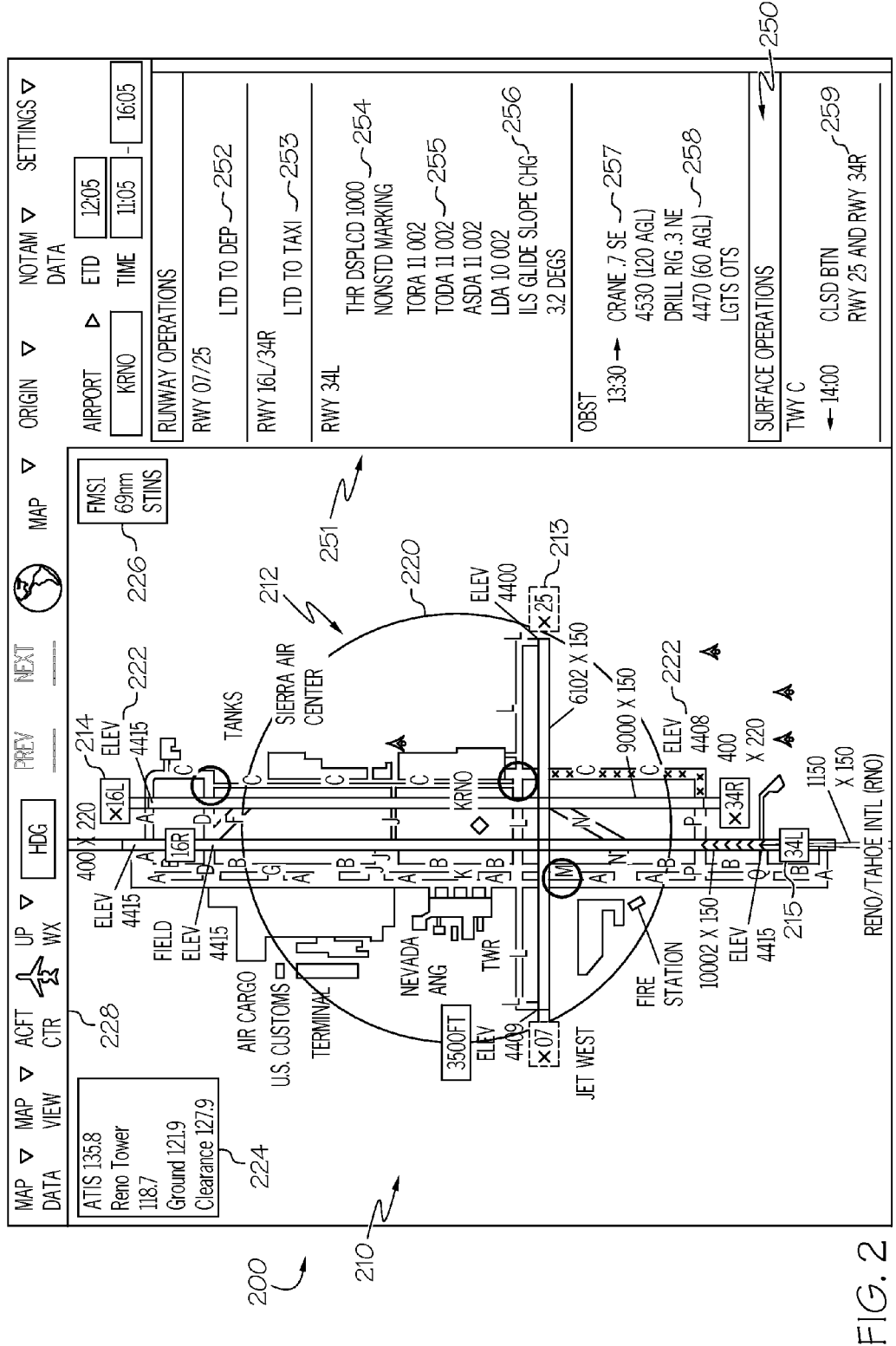
FIGS. 2-11 are examples of visual displays generated by the aircraft system of FIG. 1 in accordance with an exemplary embodiment.

Referring initially to FIG. 2, the visual display 200 includes a first area 210 and a second area 250. The first area 210 is rendered as a two-dimensional lateral situation view (referenced below as a map or navigation display 210) that depicts a graphical representation of the destination airport 212 and the surrounding terrain. Although the airport 212 is depicted, any area of interest to the user may be rendered in the navigation display 210. Generally, the user may select or position the geographical area to be displayed in the navigation display 210. In some embodiments, the geographical area displayed in the navigation display 210 is centered on the destination airport 212 and/or the current location of the aircraft. As such, in some embodiments, the navigation display 210 refreshes according to the movement of the aircraft. Although FIGS. 2-11 depict top views of the navigation display 210, other embodiments may include vertical or three-dimensional perspective views.

In addition to the airport 212, the navigation display 210 includes representations of runways 213, 214, 215 and surrounding buildings and taxiways. The runways 213-215 may be labeled, such as "34L", "16L", and so on. Similarly, the navigation display 210 may include labels for the buildings and other areas of potential interest. The navigation display 210 further includes a representation of the terrain and various navigational aids. In particular, the navigation display 210 may include a range ring 220, elevation information 222, radio frequency information 224, distance remaining information 226, and links to other screens and information 228.

The second area 250 includes a NOTAM list 251 in which NOTAM information in the form of NOTAM text messages 252-259 is provided. As discussed above, the processing unit 120 retrieves the NOTAM information, evaluates the relevance of the NOTAM information, and generates appropriate display signals for the list 251. Each NOTAM text message 252-259 provides a textual indication of the respective location and nature of the associated NOTAM, typically in a code or abbreviated form.

In the depicted exemplary embodiment, the NOTAM text messages 252-259 are grouped into NOTAM text messages 252-258 associated with runway operations and a NOTAM text message 259 associated with surface operations. The NOTAM text messages 252-259 may be further sub-divided by location or type. The list of NOTAM text messages 252-259 may be filtered, sorted, and grouped in any suitable manner. In one exemplary embodiment, the pilot or crew may selectively filter or sort the NOTAM text messages 252-259 via a user interface (e.g., user interface 110). In other embodiments, filtering and/or sorting attributes may be included in the NOTAM information associated with each NOTAM text message 252-259. For example, grouping characteristics may be is present in metadata that forms a portion of the NOTAM information (e.g., in a D-NOTAM) or generated and attached to the NOTAM information by a ground system parser.

As described in greater detail below, the NOTAM information, including the NOTAM text messages 252-259, includes interactive elements or symbology that enhance and improve recognition and evaluation. As described more clearly in the examples below, generally, there may be various types of NOTAM symbology appearing within the navigation display 210. A first type of NOTAM symbology includes symbols that appear in the navigation display 210 independently of the presence of corresponding NOTAM information in the NOTAM list 251. In some instances, the NOTAM symbology of this type may be time sensitive with respect to a particular NOTAM validity time. As such, if the NOTAM information is valid for the current time, the NOTAM symbology is displayed. Otherwise, the NOTAM symbology may not be displayed. The NOTAM symbology may further be subject to declutter rules for a particular navigation view. A second type of NOTAM symbology is displayed and/or highlighted in the navigation display 210 when a corresponding item of NOTAM information is listed in the NOTAM list 251. A third type of NOTAM symbology is displayed and/or highlighted navigation display 210 when the corresponding item of NOTAM information is listed in the NOTAM list 251 and the user selects the item of NOTAM information in the NOTAM list 251. The highlighted NOTAM symbology indicates the relevant location impacted by the selected NOTAM item. Although the exemplary embodiments discussed herein are applicable to any of these types of NOTAM information, FIGS. 3-11 are particularly applicable to the third type of NOTAM information, as will now be described.

Figure 3:
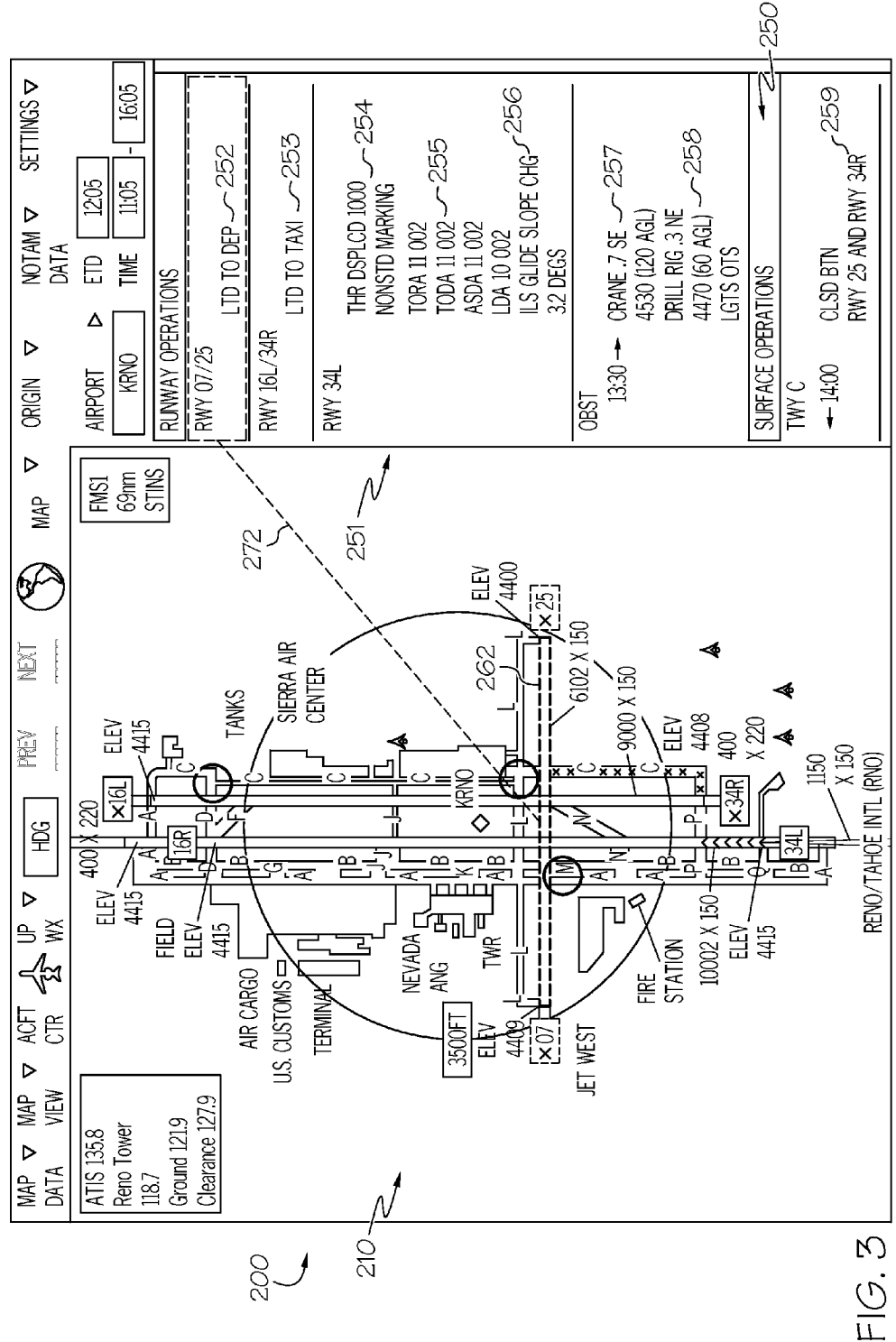

Referring now to FIG. 3, the visual display 200 corresponds to the visual display 200 of FIG. 2 except that the first NOTAM text message 252 is highlighted or activated. Such activation may occur as a result of a user selection via the user interface 110, e.g., by positioning a cursor over the NOTAM text message 252 or by touch and/or voice commands. In other embodiments, the visual display 200 may sequentially activate the NOTAM text messages 252-259. In the depicted embodiment, the activation of the NOTAM text message 252 is indicated by presenting or surrounding the NOTAM text message 252 with a lighter color tone than other NOTAM text messages 253-259. In other exemplary embodiments, any suitable manner of indicating the selected NOTAM text message 252-259 may be provided, including dynamic and static depictions.

In any event, upon highlighting or selection of the NOTAM text message 252, the system 100 renders additional NOTAM symbology on the visual display 200 of the display device 140. In particular, the visual display 200 includes a geographical highlight 262 at the relevant location associated with the respective NOTAM text message 252. As discussed above, the geographical location of the respective highlight (e.g., highlight 262) may be retrieved by the processor 110 from NOTAM information stored in the notice system 138 (e.g., as included in the geo-referenced data forming part of the NOTAM information) and graphically represented in the navigation display 250.

In the depicted exemplary embodiment, the selected NOTAM is associated with runway 07/25 of airport 213, as indicated by the "RWY 07/25" in the NOTAM text message 252, as well as the highlight 262 of the corresponding visual representation of runway 07/25. In this example, the highlight 262 of runway 07/25 is embodied as a colored outline. Any suitable type of highlight 262 that draws attention to the relevant location (e.g., to distinguish runway 07/25 from other runways) may be rendered, including a "halo" effect or change in hue or color.

In some embodiments, the highlight 262 may further indicate the nature of the NOTAM text message 252. For example, the NOTAM text message 252 reads "LTD TO DEP", which indicates that the relevant runway 07/25 is limited to departures. In one exemplary embodiment, this limitation is represented by the dashed highlight 262 that surrounds the runway 07/25.

As also shown in the visual display 200 of FIG. 3, the NOTAM symbology further includes a connector 272 that extends from the NOTAM text message 252 to the relevant spatial location, which as previously described, is emphasized by highlight 262. Any suitable type of connector 272 may be provided. In the depicted exemplary embodiment, the connector 272 is a dashed line that extends directly between the NOTAM text message 252 in the NOTAM list 251 and the highlight 262. The connector 272 may take any suitable form, including static or dynamic depictions.

Generally, the nature of the NOTAM symbology (e.g., the NOTAM text message 252, highlight 262, and/or connector 272) may depend on a number of factors. Such factors may include user selection, the content or importance of the NOTAM information, industry practice, and regulation and certification requirements. In one exemplary embodiment, the highlight symbology (e.g., highlight 262) and connector symbology (e.g., connector 272) are only displayed when the corresponding NOTAM text message (e.g., message 252) is selected by the user. In other embodiments, such symbology may be displayed without user selection, particularly when the corresponding information has particular importance and/or has a near-term impact. In further embodiments, such symbology may be displayed for any of the NOTAM text messages (e.g., messages 252-259) in the list 251.

As a result of NOTAM information represented by NOTAM text message 252, highlight 262, and/or connector 272, the relevance and the location of the NOTAM may be quickly identified and evaluated. Moreover, the amount of interpretation and consideration of the NOTAM codes is substantially reduced. In particular, the user is not required to decode "RWY 07/25" and subsequently search the navigation display 210 for runway 07/25. Instead, the highlight 262 and/or connector 272 immediately direct the attention to the user to the relevant location. In effect, the highlight 262 and connector 272 function as a "virtual finger" such that the user does not lose reference when reviewing the respective NOTAM. In some instances, the connector 272 may enable an otherwise smaller highlight 262 that allows reduced clutter without sacrificing information and/or emphasis. The remaining NOTAM text messages 253-259 may similarly be actively reviewed, as discussed in greater detail below.

Figure 4:
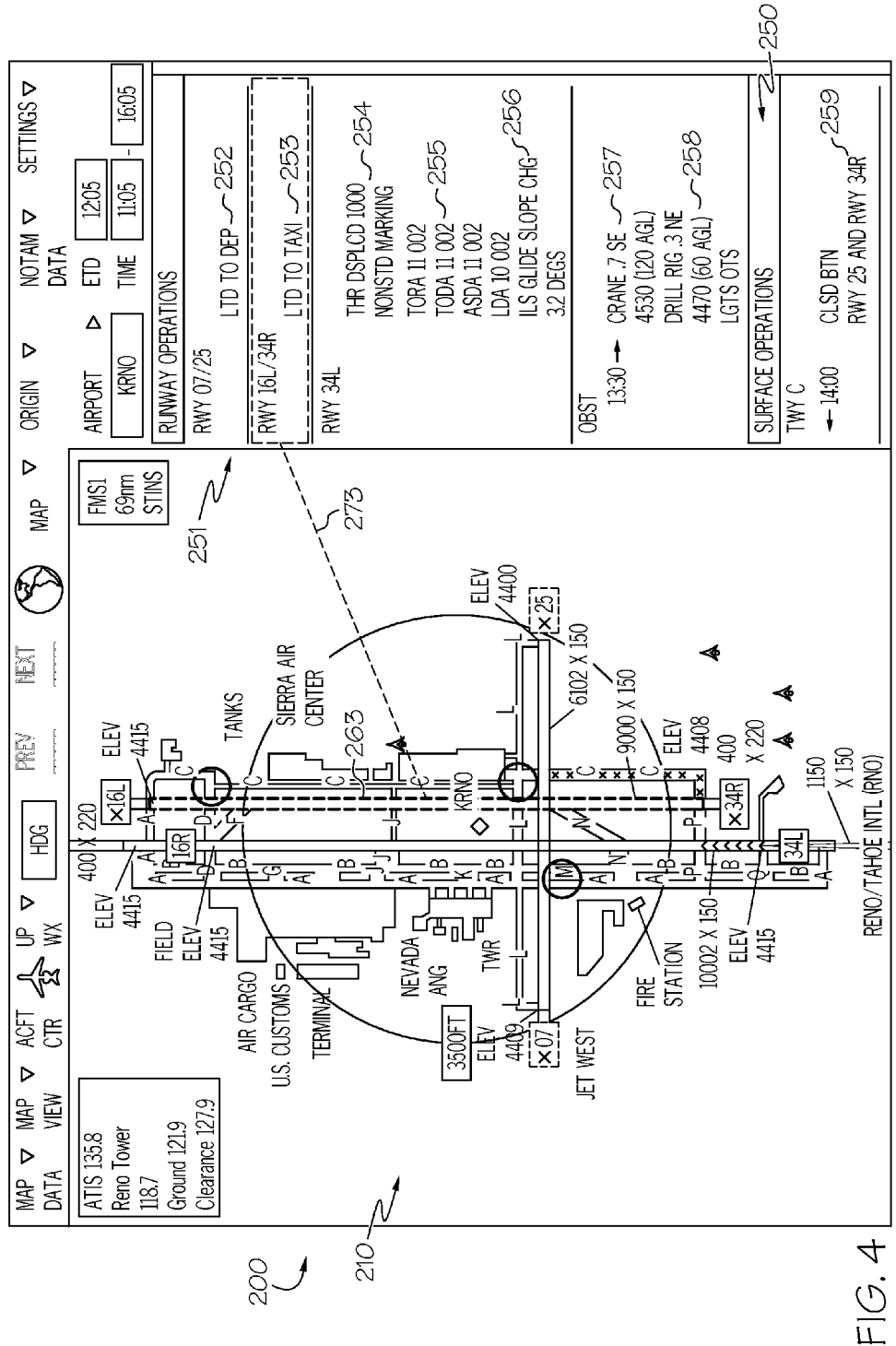

Referring now to FIG. 4, the visual display 200 is similar to the visual display 200 of FIG. 2 that includes the navigation display 210 and the list 251 of NOTAM text messages 252-259. In the depiction of FIG. 4, however, the NOTAM text message 253 is active or otherwise selected. As such, a corresponding highlight 263 and connector 273 are depicted on the navigation display 210 that correspond to the NOTAM text message 253. In this example, the NOTAM text message 253 may be decoded to indicate that runway 16L/34R is limited to taxiing. The corresponding highlight 263 is represented as a solid outline surrounding the runway 16L/34R, thereby indicating the location and nature of the NOTAM information associated with NOTAM text message 253.

Figure 5:
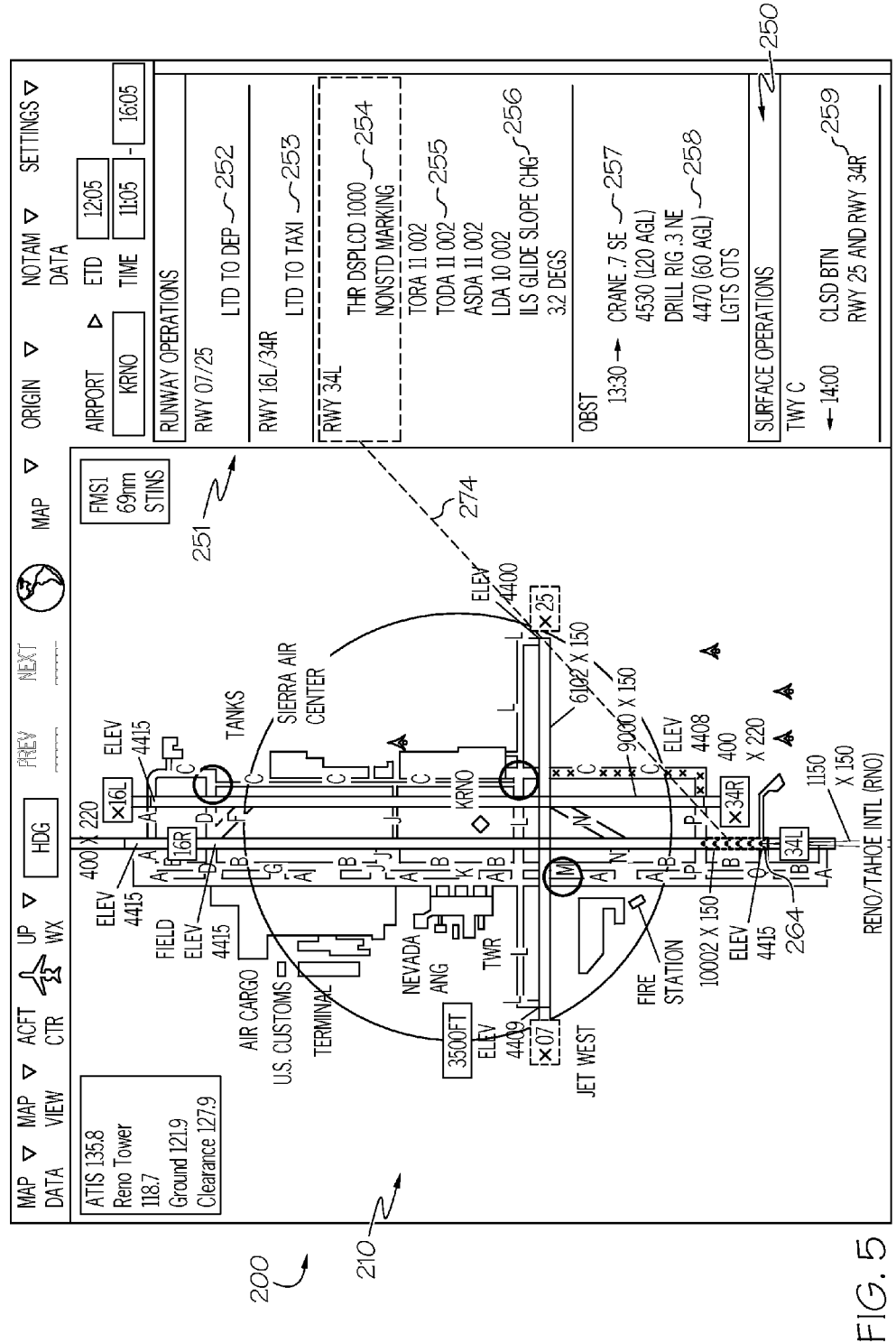

Referring now to FIG. 5, the visual display 200 is similar to the visual display 200 of FIG. 2 that includes the navigation display 210 and the list 251 of NOTAM text messages 252-259. In the depiction of FIG. 5, however, the NOTAM text massage 254 is active or otherwise selected. As such, a corresponding highlight 264 and connector 274 are depicted on the navigation display 210 that correspond to the NOTAM text message 254. In this example, the NOTAM text message 254 may be decoded to indicate nonstandard markings are provided with respect to runway 34L. The corresponding highlight 264 is represented as an enhanced or brightened area on runway 34L, thereby indicating the location and nature of the NOTAM information associated with NOTAM text message 254.

Figure 6:
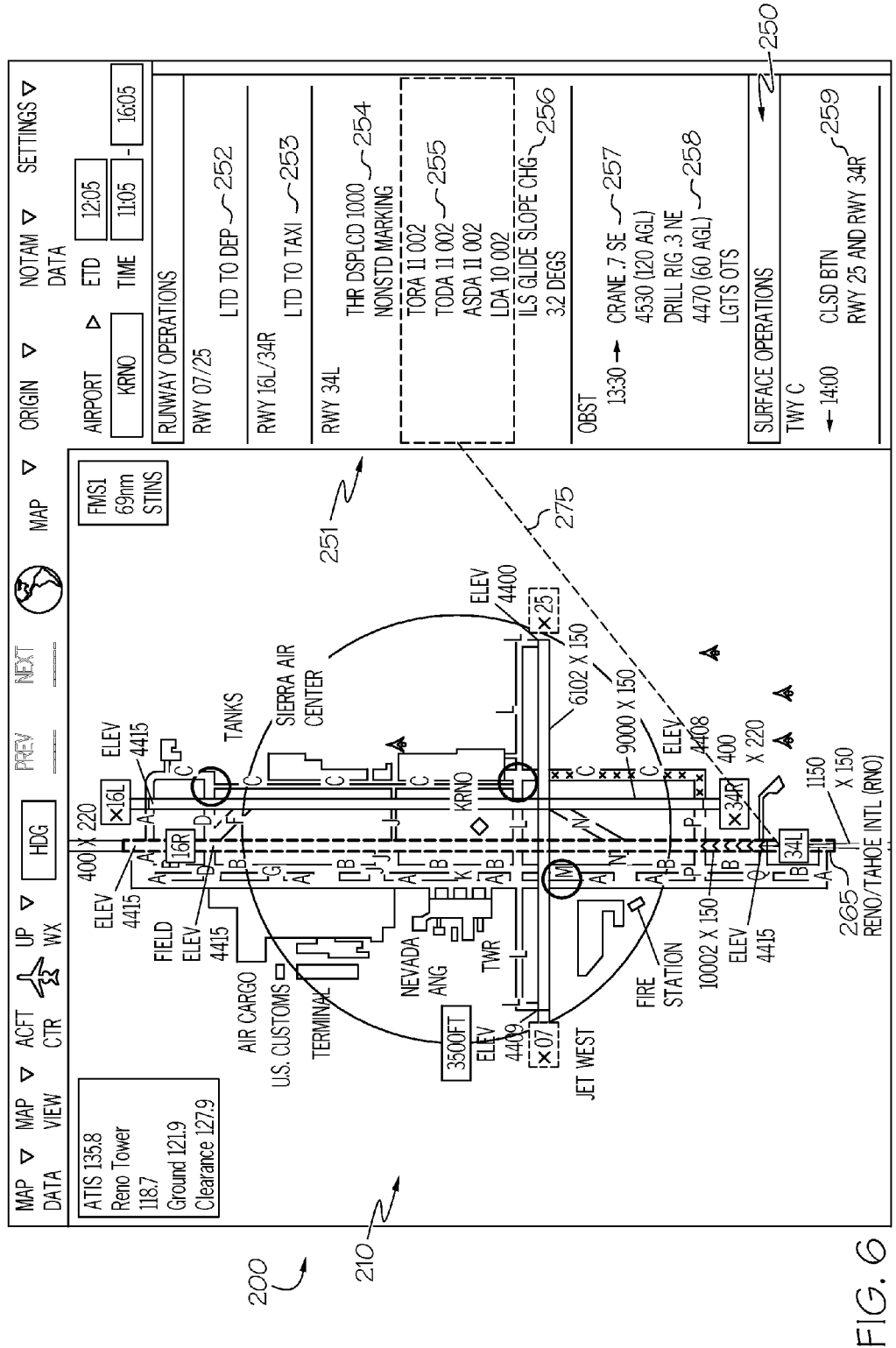

Referring now to FIG. 6, the visual display 200 is similar to the visual display 200 of FIG. 2 that includes the navigation display 210 and the list 251 of NOTAM text messages 252-259. In the depiction of FIG. 6, however, the NOTAM text massage 255 is active or otherwise selected. As such, a corresponding highlight 265 and connector 275 are depicted on the navigation display 210 that correspond to the NOTAM text message 255. In this example, the NOTAM text message 255 may be decoded to indicate the threshold displacement with respect to runway 34L. The corresponding highlight 265 is represented as an enhanced or brightened area on runway 34L, thereby indicating the location and nature of the NOTAM information associated with NOTAM text message 255.

Figure 7:
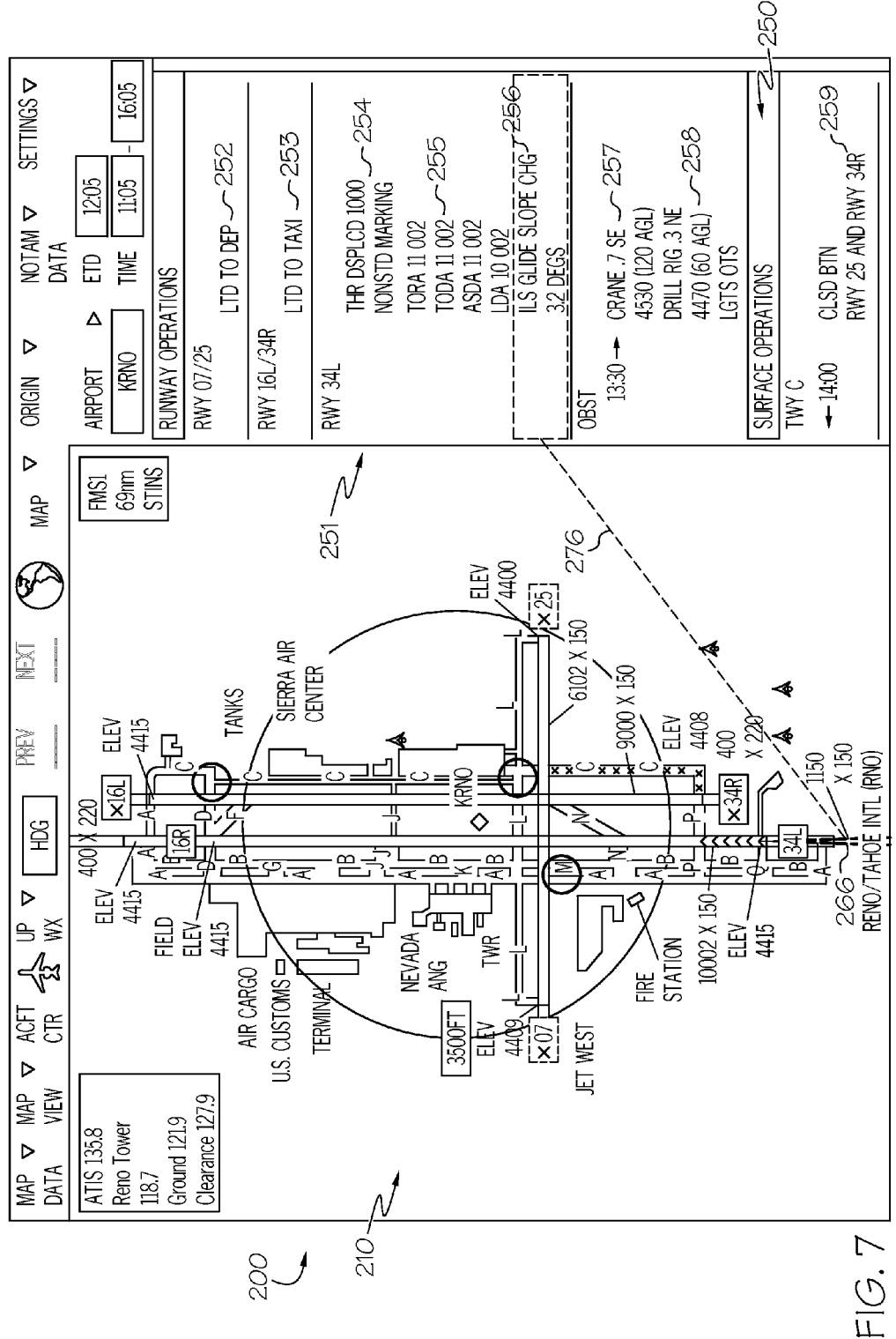

Referring now to FIG. 7, the visual display 200 is similar to the visual display 200 of FIG. 2 that includes the navigation display 210 and the list 251 of NOTAM text messages 252-259. In the depiction of FIG. 7, however, the NOTAM text massage 256 is active or otherwise selected. As such, a corresponding highlight 266 and connector 276 are depicted on the navigation display 210 that correspond to the NOTAM text message 256. In this example, the NOTAM text message 256 may be decoded to indicate the ILS glide scope changes with respect to runway 34L. The corresponding highlight 266 is represented as an enhanced or brightened area in front of runway 34L, thereby indicating the location and nature of the NOTAM information associated with NOTAM text message 256.

Figure 8:
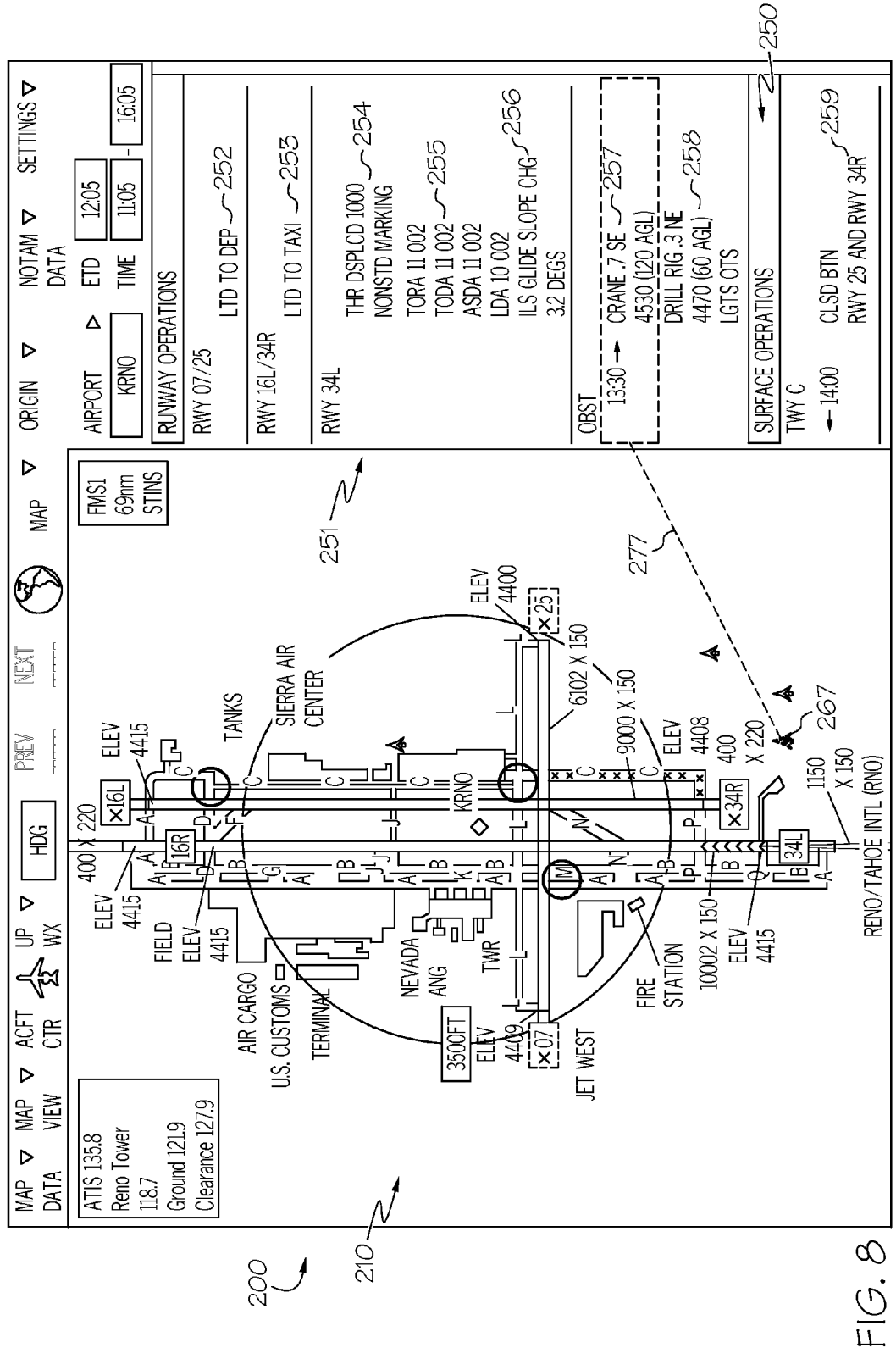

Referring now to FIG. 8, the visual display 200 is similar to the visual display 200 of FIG. 2 that includes the navigation display 210 and the list 251 of NOTAM text messages 252-259. In the depiction of FIG. 8, however, the NOTAM text massage 257 is active or otherwise selected. As such, a corresponding highlight 267 and connector 277 are depicted on the navigation display 210 that correspond to the NOTAM text message 257. In this example, the NOTAM text message 257 may be decoded to indicate a crane obstacle. The corresponding highlight 267 is represented as an enhanced or brightened area in the location of the obstacle, thereby indicating the location and nature of the NOTAM information associated with NOTAM text message 257.

Figure 9:
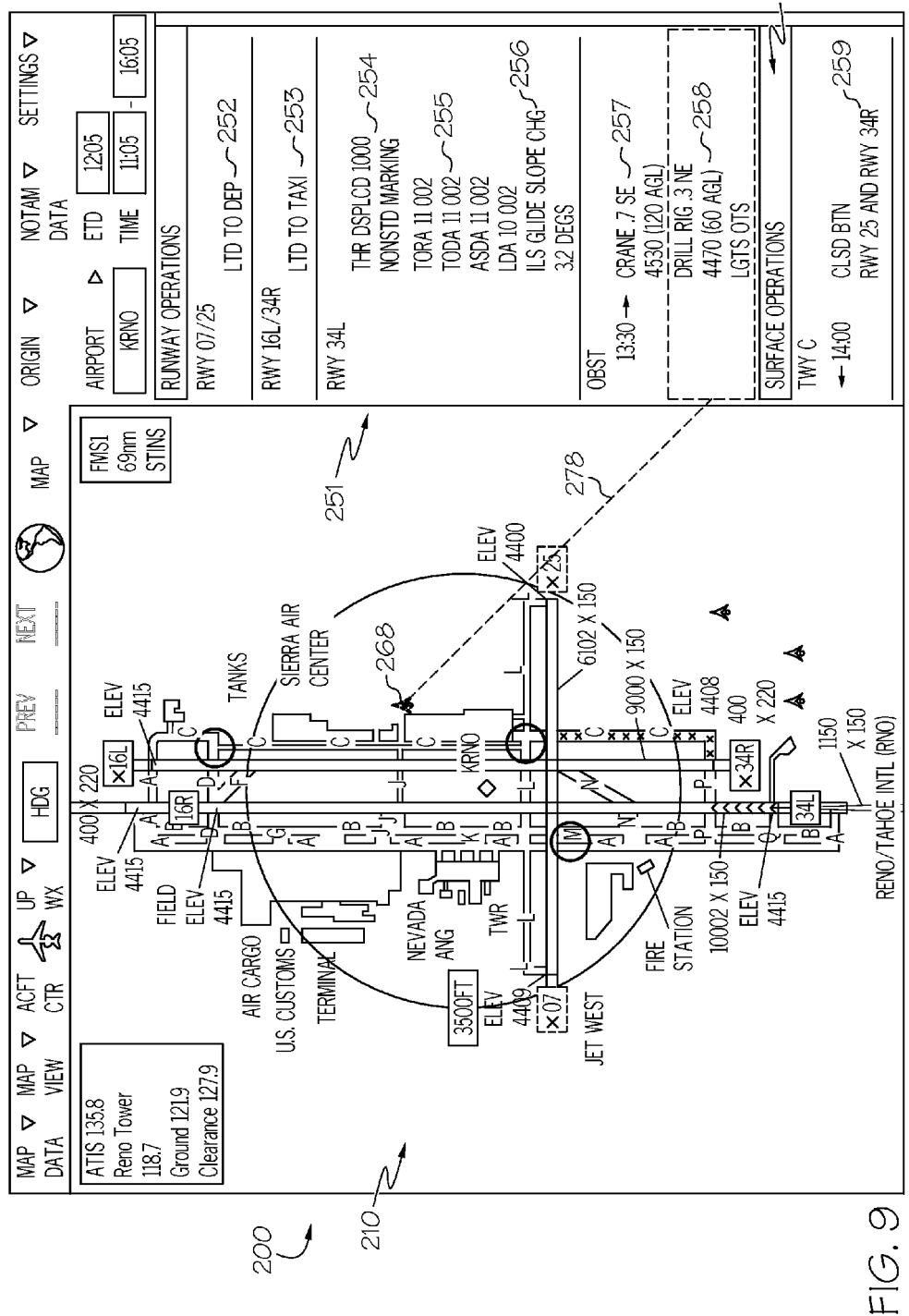

Referring now to FIG. 9, the visual display 200 is similar to the visual display 200 of FIG. 2 that includes the navigation display 210 and the list 251 of NOTAM text messages 252-259. In the depiction of FIG. 9, however, the NOTAM text massage 258 is active or otherwise selected. As such, a corresponding highlight 268 and connector 278 are depicted on the navigation display 210 that correspond to the NOTAM text message 258. In this example, the NOTAM text message 258 may be decoded to indicate a drill rig obstacle. The corresponding highlight 268 is represented as an enhanced or brightened area in the location of the obstacle, thereby indicating the location and nature of the NOTAM information associated with NOTAM text message 258.

Figure 10:
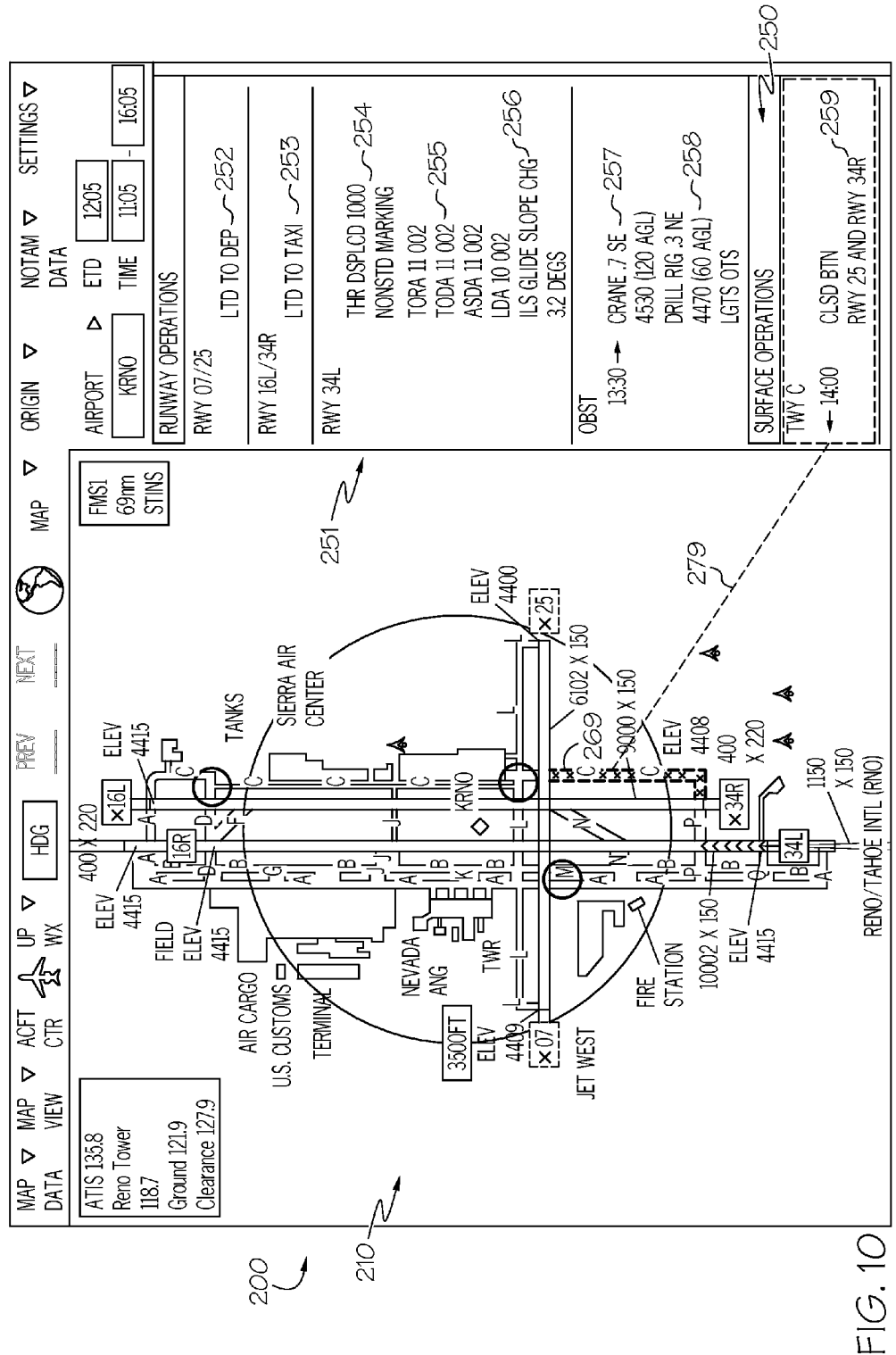

Referring now to FIG. 10, the visual display 200 is similar to the visual display 200 of FIG. 2 that includes the navigation display 210 and the list 251 of NOTAM text messages 252-259. In the depiction of FIG. 10, however, the NOTAM text massage 259 is active or otherwise selected. As such, a corresponding highlight 269 and connector 279 are depicted on the navigation display 210 that correspond to the NOTAM text message 259. In this example, the NOTAM text message 259 may be decoded to indicate that taxiway C is closed between runways 25 and 34R. The corresponding highlight 269 is represented as bolded or brightened "X" marks on the respective taxiway, thereby indicating the location and nature of the NOTAM information associated with NOTAM text message 259.

Figure 11:
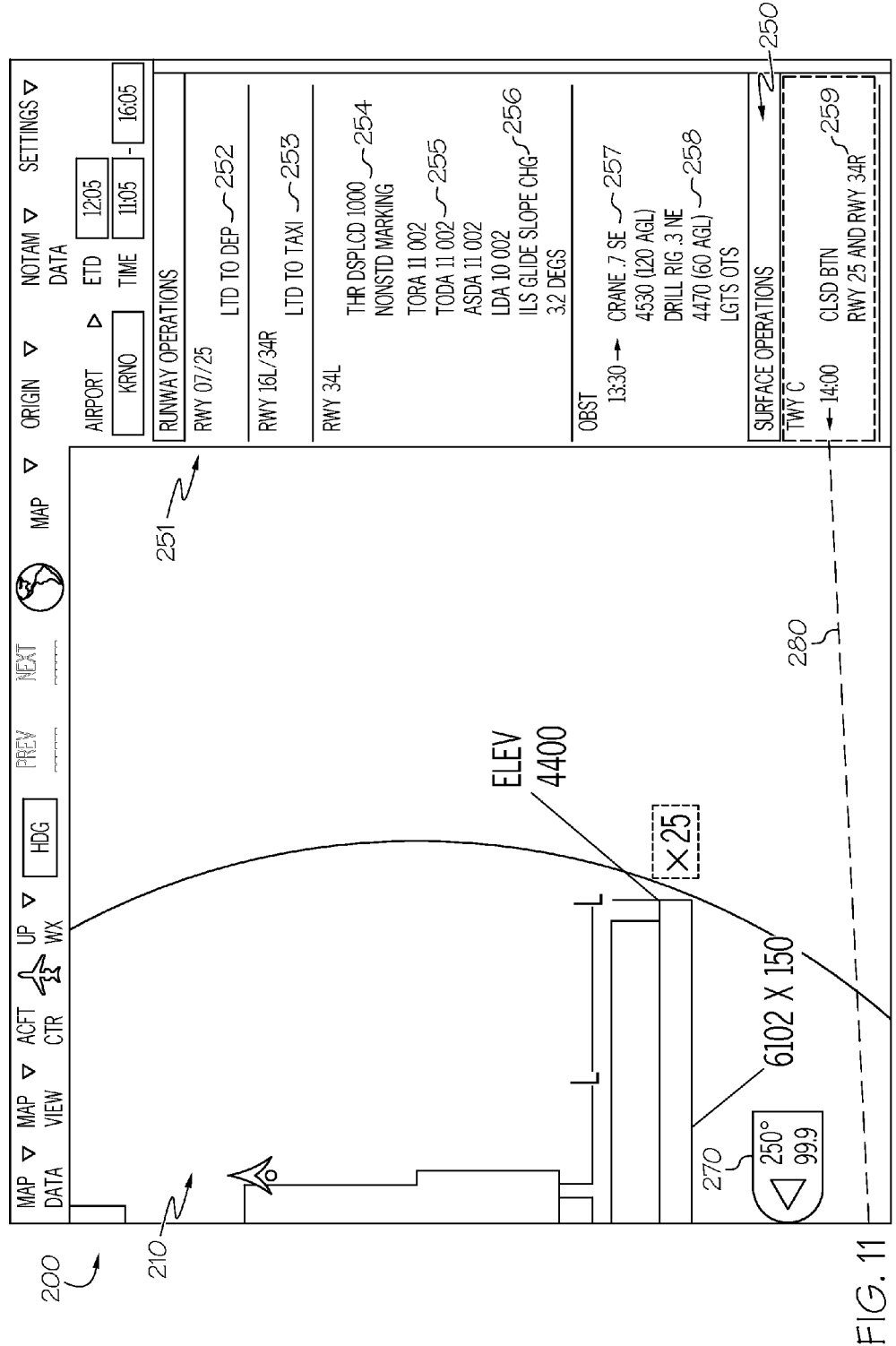

FIG. 11 is a partial view of the visual display, such as the visual display 200 discussed above. As above, the visual display 200 includes the navigation display 210 and the second area 250 with the list 251 of NOTAM text messages 252-259. In the exemplary embodiment of FIG. 11, the NOTAM text message 259 is active or selected. However, the corresponding view in the navigation display 210 does not depict the corresponding location associated with the NOTAM text message 259. In such a situation, a highlight 270 corresponding to the NOTAM text message 259 may include a pointer or other indicator that references an area off-view from the current navigation display 210. In this exemplary embodiment, the highlight 270 is positioned on the edge of the navigation display 210 closest to the corresponding off-view location. As above, a connector 280 may extend between the active NOTAM text message 259 and the highlight 270. The highlight 270 further includes an indication of the off-view location in the form of direction and/or distance. Any suitable information in the form of text, lines, symbols, number, depictions, and the like that reference the off-view location may be provided. In the event that the navigation display 210 is repositioned to display the location corresponding to the previously off-view location and the NOTAM text message 259 is still active, the highlight 270 may be replaced by a direct highlight (e.g., highlight 269 of FIG. 10), such as those discussed above.

The visual highlights (e.g., highlights 262-270) and connectors (e.g., connectors 272-280) discussed above may provide a number of advantages. As noted above, the NOTAM highlights and connectors provide an easily recognizable indication of the spatial location associated with the selected NOTAM. This may be useful on a busy and crowded navigation display with a number of features and locations. Additionally, the NOTAM highlights and connectors are particularly useful with NOTAMs associated with locations that are defined relative to other locations. For example, the NOTAM example TWY N CLSD BTN M AND H indicates that taxiway N is closed between location M and location H. As such, interpretation of this NOTAM information in a conventional NOTAM message would require identification and recognition of location M and H and subsequent identification and recognition of taxiway N. In addition this is especially difficult when these taxiways are small relative to screen size and or their naming labels are removed by decluttering. Local variations in naming conventions may further complicate conventional interpretations for crew. However, the highlight and connector to the location provide a direct identification of the relevant location.

Similarly, highlights and connectors are useful with NOTAMs associated with locations that are defined relative to other subcomponents. For example, the NOTAM example RWY 27L 500 FT SE CLSD indicates that runway 27L is closed 500 feet from the southeastern end. As such, interpretation of this NOTAM information in a conventional NOTAM message would require identification and recognition of runway 27L, evaluation of the southeastern direction, and estimation of 500 ft in that direction. However, the highlight and connector to the location provides a direct identification of the relevant location.

As an additional example, highlights and connectors are useful with NOTAMs associated with locations that are defined relative to sides of other components. For example, the NOTAM example WIP TWY C BTN RWY 27L AND N ADJ SE indicates a work in progress on the southern side of taxiway C between runways 27L and N. As such, interpretation of this NOTAM information in a conventional NOTAM message would require identification and recognition of runways 27L and N, identification and recognition of taxiway C relative to runways 27L and N, and identification and recognition of the southeastern direction relative to the taxiway. However, the highlight and connector to the location provides a direct identification of the relevant location.

Exemplary embodiments provide both the textual content of the NOTAM message and a graphical representation in a way that does not obscure other elements of the navigational view. For example, the textual NOTAM messages are positioned to the side of the navigational view, while the connector and highlights provide the graphical linkage and identification. Such graphical information enables the incorporation of information that may not otherwise be able to be expressed in textual codes.

Generally, conventional NOTAM messages may not be created consistently, the abbreviations difficult to interpret, challenging to filter with respect to location and time, and finally, challenging to evaluate. Exemplary embodiments enable a clear link between the NOTAM message and the information relevant for evaluation, particularly the location, to provide enhanced interaction and visualization in the form of a NOTAM graphical briefing. This greatly reduces the cognitive workload of the user. For example, exemplary embodiments provide NOTAM information integration within navigational views and graphical NOTAM briefings without requiring the use of paper charts and freeform notes.

Exemplary embodiments further enable graphical representation of the NOTAMs in a sequential or selected manner such that, unless otherwise selected, all NOTAMs are not simultaneously depicted on the navigational view. However, the complete list of NOTAM textual messages grouped and ordered according to context ensures that the user does not overlook any NOTAM information. The connectors enable the efficient switching of visual attention between the graphical NOTAM representations and the textual NOTAM messages.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system operating on an aircraft, comprising:
a processing unit configured to receive navigation data and notice to airmen (NOTAM) information and to generate display signals based on the navigation data and the NOTAM information; and
a display device coupled to the processing unit and configured to render an image according to the display signals with a first area depicting a navigation display based on the navigation data and a second area depicting a list of NOTAM text messages,
wherein the list of NOTAM text messages includes a first NOTAM text message associated with a first location, and wherein the display device is configured to selectively render a first highlight at the first location on the navigation display;
a user interface coupled to the processing unit and the display device and configured to receive a user selection of the first NOTAM text message of the NOTAM text messages, and wherein the display device is configured to render the first highlight based on the user selection,
wherein the display device is configured to only render the first highlight upon user selection of the first NOTAM text message.

2. The aircraft system of claim 1, wherein the display device is configured to selectively render a first connector extending between the first NOTAM text message and the first highlight upon receipt of the user selection of the first NOTAM text message.

3. The aircraft system of claim 1, wherein, prior to the user selection, the display device is configured to sequentially activate each of the NOTAM text messages, and
wherein, upon activation of the respective NOTAM text message, the display device is configured to display the highlight associated with the respective NOTAM text message at the location associated with the respective NOTAM text message on the navigation display.

4. The aircraft system of claim 1,
wherein, when the first location is depicted on the navigation display, the display device is configured to selectively render a first connector extending between the first NOTAM text message and the first location on the navigation display, and
wherein, when the first location is not depicted on the navigation display, the display device is configured to selectively render a second connector extending between the first NOTAM text message and an edge of the navigation display.

5. The aircraft system of claim 1, wherein the NOTAM information is in the form of a digital-NOTAM, and wherein the processing unit is configured to extract a location associated with the NOTAM information from the digital-NOTAM.

6. A system operating on an aircraft, comprising:
a processing unit configured to receive navigation data and notice to airmen (NOTAM) information and to generate display signals based on the navigation data and the NOTAM information;
a display device coupled to the processing unit and configured to render an image according to the display signals with a first area depicting a navigation display based on the navigation data and a second area depicting a list of NOTAM text messages,
wherein each of the NOTAM text messages is associated with a respective location, and wherein the display device is configured to selectively render a respective connector extending between each of the NOTAM text messages and the respective location on the navigation display; and
a user interface coupled to the processing unit and the display device and configured to receive a user selection of a first NOTAM text message of the NOTAM text messages, and wherein the display device is configured to render the connector associated with the first NOTAM text message based on the user selection.

7. The aircraft system of claim 6, wherein each of the respective connectors is only rendered upon selection of the respective NOTAM text message.

8. A method for presenting notice to airmen (NOTAM) information on an aircraft's visual display, comprising:
receiving NOTAM information;
determining, with a processing unit, a first NOTAM text message and a first location associated with the first NOTAM text message from the NOTAM information;
rendering, with a display device, the first NOTAM text message in a first area of an image;
selectively rendering, with the display device, a first highlight associated with the first location in a second area of the image;
determining, with the processing unit, a second NOTAM text message and a second location associated with the second NOTAM text message from the NOTAM information;
rendering, with the display device, the second NOTAM text message in a list in the first area of the image with the first NOTAM text message; and
selectively rendering, with the display device, a second highlight associated with the second location in the second area of the image,
wherein the first and second highlights are sequentially rendered in the second area.

* * * * *